May 16, 1950 H. C. FOSTER 2,508,243
FILM SPLICING APPARATUS
Original Filed Oct. 30, 1943 5 Sheets-Sheet 1

May 16, 1950   H. C. FOSTER   2,508,243
FILM SPLICING APPARATUS
Original Filed Oct. 30, 1943   5 Sheets-Sheet 2

Inventor
H. Clark Foster
By Peck & Peck
Attorneys

May 16, 1950  H. C. FOSTER  2,508,243
FILM SPLICING APPARATUS

Original Filed Oct. 30, 1943  5 Sheets-Sheet 5

Inventor
H. Clark Foster
By Peck & Peck
attorneys

Patented May 16, 1950

2,508,243

UNITED STATES PATENT OFFICE 2,508,243

FILM SPLICING APPARATUS

Harry Clark Foster, Alton, Ill.

Original application October 30, 1943, Serial No. 508,283. Divided and this application October 7, 1947, Serial No. 778,412

24 Claims. (Cl. 154—42.1)

This application is filed as a division of my co-pending parent application filed October 30, 1943, Serial Number 508,283, for Film splices, now Patent No. 2,433,446.

The present invention relates to certain improvements in film splicing apparatus; and the nature and objects of the invention will be readily recognized and understood by those skilled in the art in the light of the following detailed description and explanation of the accompanying drawings illustrating what I now believe to be the preferred embodiments or mechanical expressions of my invention from among various other embodiments, forms, designs, constructions, and combinations of which my invention is capable within the broad spirit and scope of the appended claims.

The invention is concerned with splices for joining together sections or lengths of ribbon or tape-like material, such as cinema film, where such splices are of the mechanically interlocked types in which the film ends to be joined are specially shaped and perforated to provide for mechanical interlocking thereof into spliced connection, such for example, as the various types and forms of mechanically interlocked splices of my invention as shown in my above referred to pending application, Serial Number 508,283.

It is a general object of the invention to provide an apparatus with which film section ends (or the like) to be spliced can be quickly and accurately prepared and assembled into mechanically interlocked relation to form and complete the splice, by simple and natural movements of the film sections through mechanically guided operations.

It is a further object of the invention to provide a design and arrangement for such an apparatus in which the shaped and prepared ends of the film sections may be efficiently spliced with a minimum of bending or twisting of the film ends by the apparatus, so as to reduce to a minimum the possibility of breaking or damaging the film.

It is a further object to provide such an apparatus in which the film sections to be spliced are positioned and held by the apparatus in proper relation to the picture "frames," first for film section end shaping, and then for mechanical interlocking of the shaped film ends by film manipulating members, so that the uniform linear spacing of said frames is maintained through the area so spliced.

A further object is to so design and arrange such an apparatus that by a reverse operation thereof, it will be capable of detaching and disengaging previously spliced film sections without damage to the film or impairment of the film section ends for resplicing.

Another object of the invention is to provide such an apparatus which will be of relatively simple mechanical construction, of compact arrangement and of dimensions such as to occupy a minimum of space, yet which will be capable of efficient and accurate operation in use with adjustment and maintenance reduced to a minimum.

Another object is to provide such a film splicing apparatus of the manually operable type which will require for its operation only simple and natural hand movements by an operator, and with which the accurate mounting and positioning of the film section ends in the apparatus preparatory to splice forming, will call for a minimum of hand manipulation and adjustment by the operator, so that the possibility of inaccurate or erroneous positioning will be substantially eliminated and the apparatus may be efficiently operated without requiring extensive instructions or training.

It is a further object of my invention to provide a form of punch and die mechanism for preparing and shaping the ends of the film sections to be mechanically interlocked and spliced together, so as to form the members and edges at each film section end properly positioned and located thereon for mechanical interlocking with the members and edges, respectively, formed in the opposite film section end; and further to provide a design for such a punch and die mechanism that will be of compact form and of relatively simple mechanical construction and operation, so that an operator may quickly, and, if desired, simultaneously accurately shape and form the ends of the film sections to be spliced.

My invention also holds as a further object the provision of a unitary apparatus cooperatively arranged to facilitate the shaping and assembling of film section ends while yet allowing separate operation of the assembling mechanisms for film disassembling purposes.

With the foregoing general objects, features and results in view, as well as certain others which will be readily recognized from the following detailed description, my invention consists in certain novel features in design and in constructions and arrangemets of elements and parts, all as will be hereinafter more fully referred to and explained.

Referring to the accompanying drawings in which similar reference characters refer to corresponding parts and elements throughout the several figures thereof.

As examples of film assembling apparatus embodying my invention, I have disclosed in the accompanying drawings, several possible forms thereof, of which the form disclosed in Figs. 1, 3, 4, 5, 12, 13, 14 and 15, may be considered to be a preferred form. I have, in this instance, disclosed such preferred form of the splice assembling apparatus in a cooperative and coordinated combination and association with a film section end shaping and forming apparatus of my invention, to thus form and provide a single unitary splicing apparatus of a compact character with which all of the operations necessary, both to prepare the film sections for and to assemble the prepared sections into mechanically interlocked final splice form, can be performed and carried out by an operator. The unitary apparatus as above generally described and as will be hereinafter described in detail, itself forms a part of my present invention.

I have selected from the several forms of mechanically interlocked splices of my invention as disclosed in my above referred to co-pending application, Serial Number 508,283, one form for which the unitary apparatus hereof consisting of the film section end shaping and forming apparatus and of the splice assembling apparatus, is particularly adapted, although it is to be understood that neither the section end forming and shaping apparatus nor the splice assembling apparatus are limited to embodiments thereof designed for shaping the film section ends and for assembling such ends into splice of the selected example hereof.

Figures 1, 2, 3, 4, 5, 6, 7, 8, 9:
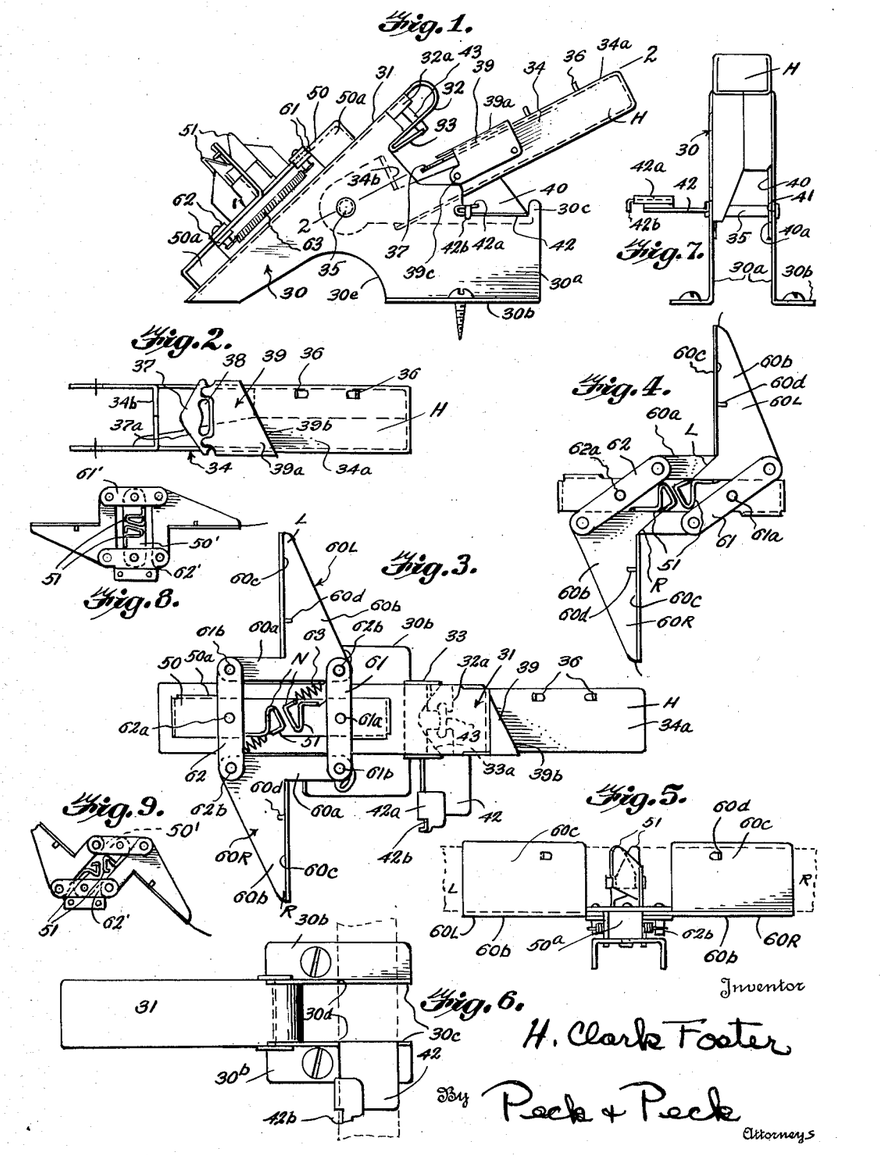
Fig. 1 is a view in side elevation of a unitary apparatus of my invention for shaping and performing the film section ends to be spliced, and for mechanically manipulating the prepared film section ends into mechanically interlocked and completed splice forming relation.
Fig. 2 is a top plan view of the swinging die and film locating member of the apparatus of Fig. 1, taken as from the line 2—2 of Fig. 1.
Fig. 3 is a top plan view of the apparatus of Fig. 1, with the splice assembling mechanism in its normal position for receiving the prepared film section ends to be spliced.
Fig. 4 is a top plan view of the assembling mechanism of Figs. 1 and 3, with the film carriers of such mechanisms swung to position for interlocking and completing the splicing of the ends of the film sections.
Fig. 5 is a front elevation of the assembling mechanism of Fig. 3, taken as from the left hand end of Fig. 3.
Fig. 6 is a top plan view of the body or frame of the apparatus of Fig. 1, with the swinging die member of Fig. 2 and the splice assembling mechanism of Fig. 4 removed.
Fig. 7 is a rear elevation of the apparatus of Fig. 1, with the splice assembling mechanism or unit removed.
Fig. 8 is a top plan view of the modified arrangement of the splice assembling mechanism, such modified arrangement being shown in normal position to receive the prepared ends of film sections for splicing.
Fig. 9 is a top plan view of the modified splice assembling mechanism of Fig. 8, with the mechanism being swung to splice assembling and forming position.

The preferred form of the splice assembling and forming apparatus, referring now particularly to Figs. 1 and 3, embodies a suitable base, which, in the example hereof, comprises a central base member 50 provided with supporting legs 50a at opposite end portions thereof, respectively. These legs 50a are secured in any suitable manner to the supporting surface on which the base of the splice forming apparatus is to be mounted. In this instance, where I have shown the preferred form of splice assembling mechanism as providing a component of the unitary combined film end shaping and film splice forming apparatus, the central base member 50 of the assembling apparatus is mounted upon the upwardly and rearwardly inclined forward or front wall 31 of the body 30 of such unitary apparatus. In the unitary apparatus, the body 30 mounts the film section end forming and shaping mechanism which forms a component of the combined organization. Such forming and shaping mechanism will be hereinafter described and explained in detail.

Thus, the arrangement of the base member 50 with its support legs 50a on the upwardly and rearwardly inclined front wall 31 of the body 30, is such that the upper wall of base member 50 of the splice assembling mechanism, is elevated or positioned spaced above and in an upwardly and rearwardly inclined position substantially parallel with the inclined front wall 31 of body 30.

Figures 10, 11, 12, 13:
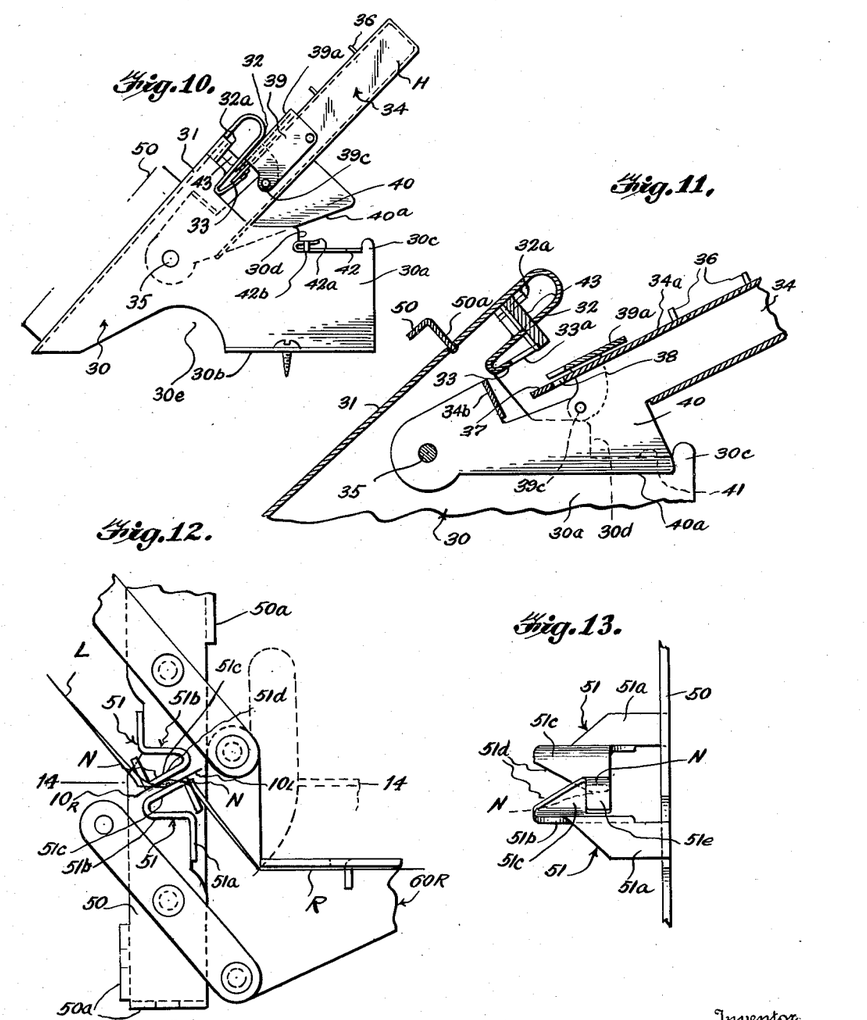
Fig. 10 is a view in side elevation of the unitary apparatus of Fig. 1, with the swinging die member swung upwardly and forwardly to position for shaping and perforating the film section ends, the film assembling mechanism of Fig. 1 being removed.
Fig. 11 is an enlarged, vertical longitudinal section through the swinging die member and the associated punch and film shaping member together with their mountings, the film shearing or cut-off blades being also shown in side elevation.
Fig. 12 is an enlarged top plan view showing the film assembling nose pieces with the film carriers swung to position to manipulate the prepared ends of the film sections around and across the nose pieces to interlock the film ends into spliced engagement.
Fig. 13 is a view in side elevation of the nose pieces for engaging and interlocking the film ends.
Figure 14:
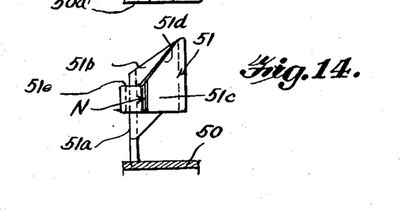
Fig. 14 is a vertical sectional view through the film engaging nose pieces taken as on the line 14—14 of Fig. 12.

In accordance with a primary feature of splice assembling apparatus of the invention, illustrated as designed for the particular splice form selected as an example, film interlocking or assembling nose units or members 51 are mounted in spaced relation on the base member 50 intermediate the ends thereof with the members 51 extending vertically upwardly from the base 50. The members 51 are so formed and relatively positioned as to provide surfaces adapted to engage the shaped ends of film sections disposed and positioned therebetween in such a manner that, when the film section ends are moved relatively to and in engagement with and over and across such surfaces, the shaped film section ends are interlocked into completed splice forming relation. The members 51 are of identical design and construction and, referring now to Figs. 12, 13, and 14, are each formed in the example hereof from sheet or plate material suitably shaped and bent to the desired form. Each member 51 comprises a supporting post or leg 51a having an arm portion 51b extending laterally from the upper portion thereof at substantially right angles to the leg. (See Fig. 12.) A wing 51c is formed extending from the outer edge portion of arm 51b, inclined outwardly away from the arm 51b and extending across the side of arm 51b that is opposite the side from which the supporting post 51a extends. The upper edge 51d of the wing 51c is inclined downwardly and outwardly from its upper portion at the arm 51b to the lower outer portion of the wing, from which a flange 51e extends rearwardly from the wing 51c toward the arm 51b and at substantially right angles to the plane of wing 51c. The flange 51e forms in effect a continuation of the lower portion of the wing 51c and is of a height or vertical width considerably less than the height or vertical width of the wing at arm 51b. The flange 51e extends rearwardly toward and terminates adjacent to the inner edge portion of the arm 51b at the supporting post 51a. The lower outer portion of the wing 51c and the flange 51e together form an outwardly projecting nose N which is located in elevated position above the lower end of the supporting post 51a but below the upper end portion of the wing 51c and the arm 51b from which the wing extends, so that, the nose N of a unit or member 51 is located at an intermediate position on the member and extends or projects laterally outwardly therefrom at the side of the arm at which the support post 51a is located.

The nose forming units or members 51, referring to Fig. 12, are mounted and secured in fixed position on the base 50 by means of the supporting posts 51a, with the arms 51b of the units 51 disposed transversely of base 50 and the wings 51c facing each other but spaced apart in parallel relation so as to provide a space therebetween with the noses N located at opposite ends and on opposite sides, respectively, of such space. The space between wings 51c and noses N is adapted to receive the overlapped film section ends to be spliced, and the gradually outwardly sloping or inclined and upwardly diverging edges 51d of the wings 51c provide guide edges to assist in the operation of inserting and positioning the film section ends between the noses N in operative engagement and relation with the noses. The mounting and relative position of the nose forming members 51 is such that the noses N thereof are disposed so as to extend a slight distance across and to opposite sides of a center line through the positioned units drawn transversely of the base 50. In the present example, each nose piece N in effect overlaps the other a distance substantially equal to the thickness of the material of the nose piece, although the invention is not limited to such spacing, as the extent or degree of the overlap will vary in accordance with each application and in accordance with the size of the film and the particular shaping and perforating of the film section ends. The relative position of the nose forming members 51 with the noses N thereof in such overlapped relation is clearly shown by Fig. 13.

Movable carriers 60L and 60R for the ends of the film sections to be spliced, are located at opposite sides, respectively, of the nose forming members 51 for movement relative thereto and therearound to so engage the film section ends with and displace the same relative to the noses N as to cause such noses to interlock and assemble the film section ends into the completed splice. Referring now to Figs. 3 and 4, in connection with Fig. 12, each film section carrier embodies a base 60a having a laterally extending portion or wing 60b provided along its inner edge intermediate the base 60a with a vertically upstanding film positioning and holding surface or plate 60c against which a film is adapted to be held and positioned by a suitable film sprocket hole engaging ear or tab 60d extending outwardly from that side of the plate above the laterally extending portions 60b of base 60a. A film section is guided and positioned on a film carried by placing the section against the inner surface of plate 60c with the lower edge of the film bearing against and engaged with the upper surface of the base portion 60b and with the positioning tab 60d received in the proper film sprocket hole for the required location of the end of the film section relative to the nose N.

The film carriers 60L and 60R are movably mounted at opposite sides of the nose forming members 51 and the base 50 by a suitable link mechanism mounted and supported from the base 50. Such link mechanism comprises a pair of links 61 pivoted on the base 50 by a pivot pin 61a with one link located above and the other below base 50, and the links in normal position disposed transversely of and across the base. A similar pair of links 62 are pivoted to the base 50 in position respectively above and below base 50, by a pivot pin 62a, with the links 62 disposed transversely of the base 50 and located a distance below the adjacent nose forming member 51. The film carrier 60R is mounted at the right hand side of base 50 by pivotally connecting the opposite ends of its base 60a between the spaced ends of the pairs of transverse links 61 and 62, by means of the pivot pins 61b and 62b, respectively, with the laterally extended portion or wing 60b of base 60a and the film positioning plate 60c located at the right hand side of base 60a. The film carrier 60L is mounted at the left hand side of base 50 with its opposite ends pivotally connected between the spaced ends of the pairs of links 61 and 62 by the pivot pins 61b and 62b, respectively, but with the laterally extended portion 60b of the base 60a and the upwardly or vertically disposed film position plate 60c disposed at the left hand side of the base. In this manner, with the film carriers and their supporting and motion defining link mechanism in normal position with the pairs of links 61 and 62 in parallel relation disposed transversely of the base 50, the inner film receiving surface of the film positioning plate 60c of carrier 60R lies substantially in the same plane with the inner film receiving surface of the film positioning plate 60c of the film carrier 60L, that is, these opposite side plates 60c of the film carriers 60L and 60R are slightly offset so that the end of the film section positioned on the right hand plate may be overlapped over the end of the film section positioned on the left hand plate.

The pairs of links 61 and 62 are maintained in normal transverse position to maintain the film carriers in normal position for receiving the film sections to be spliced, by means of a suitable spring or the like 63, which in the example hereof, is a contractile spring attached between the pivot pin 62b at one end of the pair of upper links 61 and the diagonally opposite pivot pin 62b of the lower pair of links 62, so that, the spring 63 constantly tends to draw the links and the carriers mounted thereon to their normal position such as shown in Fig. 3. The links of the film carriers are maintained in normal position against the displacing action of spring 63 by the abutment of the links 61 and 62 against the adjacent edges, respectively, of the opposite side base supporting legs 50a (see Fig. 3). The arrangement of the legs relative to the links is such that the links and film carriers are free to move in the direction for film splice operation opposite to the direction of movement to which displaced by the action of spring 63.

With the assembling apparatus of the form above described, referring to Figs. 3 and 12, it should be noted that the length of the links 61 between the central pivot pin 61a and an outer pivot pin 61b, is somewhat less than the distance between the inner edge of a film positioning plate 60c and the center of the base 50. By this arrangement an effective shortening or lengthwise movement of the film section on and with a plate 60c, toward the nose N, is provided for when the film section is deflected around the assembling noses N during the operation of the apparatus.

Figure 26:
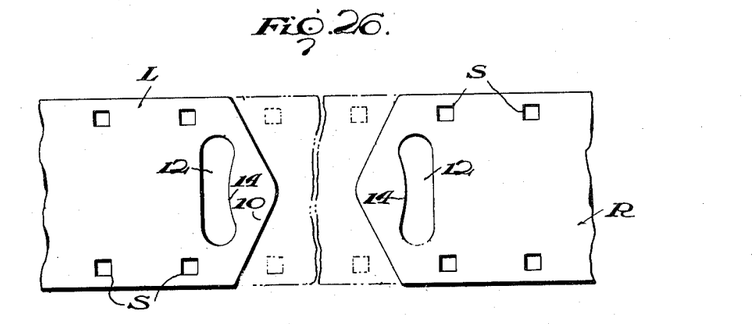
Fig. 26 is a plan view of film section ends shaped to provide a form of mechanically interlocked splice.

In the operation of the above described form of film assembling apparatus, for splicing opposite film sections, which, for example, may be formed and shaped as shown in Fig. 26 of the drawings, the film sections are first positioned on the film carriers when the latter are in the position of Fig. 3. In assembling and splicing the ends of the film sections, which sections L and R are shaped and formed in accordance with Fig. 26, the film section L is positioned against the guide plate 60c of film carrier 60L with the end of the film section resting on and against the nose N of the member 51 located on the right hand side of base 50. With the end of film section L so positioned, the ear 60d of film carrier 60L is engaged in a sprocket hole S of the film section to finally so position the film on the guide plate 60c. The film section R is then inserted between the members 51 with the end thereof over the film section L and located under and against the nose N of the member 51 positioned at the left hand side of the base 50. After being so positioned, film section R may then be drawn outwardly to the right and the lips 14 of the film section L and R will then become hooked or interlocked under each other (see Figs. 29 and 12) due to displacement by the noses N which project in opposite directions, respectively, over the center line through the guide plates 60c when the film carriers are in the position of Fig. 3. In this manner, when the lips 14 are engaged and hooked together, the film section R will then be drawn to position for locating one of its sprocket holes S over the tab 60d of the guide plate 60c of film carrier 60R, to thereby finally position film section R preparatory to the next assembling operation by the apparatus. Then while holding the respective film sections R and L against the guide surfaces 60c of the film carriers 60R and 60L, the right hand film carrier 60R is displaced and moved downward to the position shown in Figs. 4 and 12, thereby correspondingly moving film carrier 60L upwardly and causing a displacement or rotating movement of the film sections R and L around the members 51 to cause the noses N to push or displace the end tab 10 of each film section through the perforation 12 of the opposite film section to complete the interlocking and final assembly of the splice into position and relation connecting the film sections R and L together. Upon the completion of this operation, the film carriers 60R and 60L are then returned to their normal position alined transversely of the base 50 as shown in Fig. 3, and the completely spliced and connected film sections (see Figs. 27 and 28) are then removed from the apparatus. The displacement of the end tabs 10 of the film section R and L by the action of the noses N with the film carriers in the position of Fig. 4, is clearly shown by the enlarged view of Fig. 12, in which end tab 10 of film section R is shown in position forced through perforation 12 of film section L by nose N at the left side of the base 50, while tab 10 of film section L is shown in position forced through perforation 12 of film section R by the nose N at the right side of the base 50. It is to be here noted that the height or vertical length of each nose N is less than the length of the perforations 12 formed in the shaped ends of the film sections, in order that these noses may readily function to flex and force the film section end tabs 10 through perforations 12. When the film carriers are returned to their normal position of Fig. 3, the connected and spliced film sections R and L will flex back into and assume normal alinement and the tabs 10 shown as extended and held in outwardly projected positions from opposite sides of the film by the noses N, will flex and snap back toward and assume positions flatly against the side surfaces of the film respectively adjacent such tabs as shown, for example in Figs. 27 and 28 of the drawings.

Figure 27:
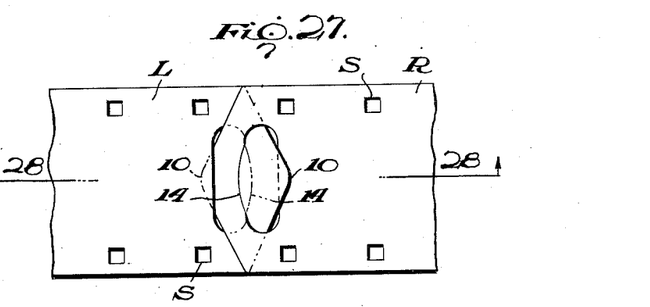
Fig. 27 is a top plan view of the film section ends of Fig. 26, mechanically interlocked to form the completed splice.
Figure 28:
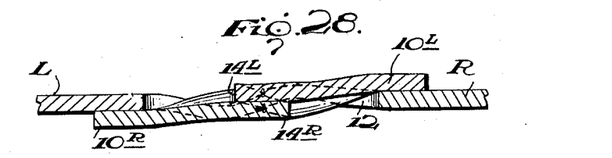
Fig. 28 is an enlarged vertical longitudinal section through the completed splice of Fig. 27 taken as on the line 28—28 of Fig. 27.
Figure 29:
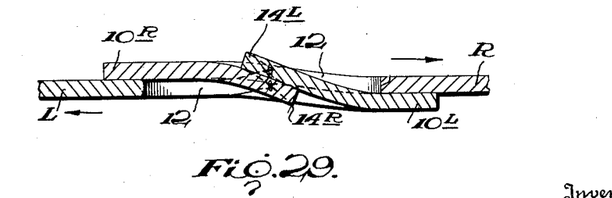
Fig. 29 is an enlarged vertical longitudinal section of the splice of Fig. 27, but showing the film section ends in their initial assembled and partially interlocked position.

The film splice assembling apparatus in the form as above described, is designed and intended to also be employed for the purpose of disassembling and disconnecting spliced film sections. For example, with the splice as shown in Figs. 27 and 28, connecting the film sections R and L, in order to disassemble the splice and disconnect the film sections, the spliced film is inserted between the members 51 but with the film sections in reverse position to their position when placed in the apparatus for splice assembly, that is, for disassembly the splice is positioned between noses N with the film section L uppermost and overlapping the film section R. The spliced film is positioned in the apparatus with the splice located between members 51 so that the noses N engage the film section end tabs 10 at the opposite sides, respectively, of the film sections, at the film section perforations 12. Then by displacement of the film carriers 60R and 60L from normal position of Fig. 3 to the maximum displaced position of Fig. 4, the noses N will force the end tabs 10 of the film sections back through the perforations 12 into which they were interlocked so as to disengage the end tabs from the film sections. The film sections may then be removed from the apparatus and the engaged lips 14 of the sections unhooked to thereby completely separate and disconnect the film sections R and L. Such operations are carried out without damage to the film sections, or to the shaped ends thereof, so that the disconnected sections may, if desired, be rearranged in editing and spliced to other film sections by use of the splicing apparatus.

The assembling and splice forming apparatus of the form of Fig. 3, is not limited or restricted to the particular mounting, arrangement and operating movement of the film carriers 60L and 60R and the link mechanism for the carriers which embodies the links 61 and 62 pivotally mounted on the base 50 for rotation about the central pivots 61a and 62a. A modified form and arrangement of linkage for the carriers is more or less diagrammatically disclosed and indicated in Figs. 8 and 9. According to this modification, the required action and movement of the film carriers may be obtained by mounting such carriers for swinging on stationary lower link 62′, instead of moving the film carriers in horizontal parallelism about the pivots 61a and 62a at the center of both the upper links 61 and lower links 62, in accordance with the form of Fig. 3. In the modification of Figs. 8 and 9, the nose forming members 51 are mounted upon a base member 50′ which is centrally pivoted at its lower end to the stationary link 62′, and which is pivoted at its upper end at the center of the links 61′, intermediate the end pivots of such links by which the film carriers are connected with the links. The normal position of this modified film carrier mounting and arrangement is shown in Fig. 8, and in order to operate the arrangement for film splicing and assembly, the film carriers, with the base member 50′ on which the nose forming members 51 are mounted, are swung laterally and rotated about the pivot points on the lower stationary link 62′ in a direction to the right in the present example, to assume the position shown in Fig. 9, and by such movement to thereby rotate or displace the film section ends on the carriers and the nose forming members 51, relative to each other, in order to interlock and assemble the ends of the film sections. It is here noted that, in this instance, the carrier surfaces 60c and nose pieces 51 are reversed and that the left film end L would be placed over the right film end R.

The preferred form of the splice assembling apparatus as above described, is combined with film section end forming and shaping apparatus to provide the combined, unitary apparatus of the invention as disclosed in Figs. 1, 3, 10 and 11. One possible form which the film section end shaping mechanism may take is illustrated in the drawings as designed to form the type of mechanically interlocked splice of Figs. 26 to 29, although it is to be understood that the illustrated form of film section end cutting and shaping apparatus is not limited to the shaping and forming of film ends for the form of splice of Figs. 26 to 29. It is contemplated, and the invention includes the necessary design and shape changes in the cutting and perforating elements of the apparatus, required to adapt the apparatuse to shape and form the film section ends to any desired particular design and arrangement of splice.

The embodiment of the film section end cutting and shaping apparatus selected as an example for purposes of explanation, is illustrated in Figs. 1, 2, 3, 6, 7, 10 and 11. The apparatus includes a body or base structure 30, which may be in the form of a stamping of suitable metal or other material, formed to provide the opposite side spaced vertical walls 30a having the outwardly turned, lower horizontally disposed supporting base forming footings or flanges 30b. The body 30 includes the front or forward wall 31 which is inclined or sloped upwardly and rearwardly to terminate in a downwardly and forwardly extended punch holding member 32 extending a distance spaced below but substantially parallel to the front wall 31 of the body. The punch holding member 32 is, in the present example, bent back to extend rearwardly and upwardly from the forward end of member 32 to provide the integral film end shaping member 33 spaced therebelow but inclined slightly downwardly out of parallelism therewith, and terminating spaced a distance forwardly from the upper rear end of punch holding member 32. The side walls 30a are cut away at their lower, forward portions to provide the openings 30e through which the film scraps and cuttings resulting from the film end forming and shaping operations may be readily removed.

A swinging die carrying member or arm 34, preferably formed as a stamping and of generally closed channel or box shape in cross section, is mounted for vertical swinging on a horizontally disposed pin or shaft 35 which is mounted extending across and between the opposite side walls 30a of the body 30, the ends of the pin 35 being suitably secured and positioned in the opposite side walls, as will be clear by reference to Fig. 7. The swinging die carrying arm 34 is rotatably mounted at its forward end on pin 35 between side walls 30a of the body 30, and extends upwardly and rearwardly from the body and beneath the punch holding member 32 and end shaping member 33 formed and positioned at the upper rear end of the forward wall of the body. The outer end portion of the swinging arm 34 forms a handle member H, and the upper side of arm 34 provides a surface 34a for receiving a film section or sections and for properly positioning the end or ends thereof in the apparatus for shaping and forming. Spaced ears or pins 36 are provided, in the present example, extending upwardly from the upper surface 34a of the swinging arm 34, for engaging sprocket holes of a film section or sections in order to properly and accurately position a film section and the end thereof on the swinging arm 34 for forming and shaping.

The ears 36 are formed by bending up portions of the upper wall of the arm 34, and attention is directed to the fact that if, as in the present example, the metal or other material from which the swinging arm is stamped or otherwise formed, is too thin to form an ear or tab 36 of a size to properly occupy a sprocket hole of a film to hold the film in position without end or longitudinal play or movement relative to the ear, then two or more ears may be employed as shown in the accompanying drawings, with a proper spacing therefor to enter the sprocket holes of a film with one ear engaging the lower side of the sprocket hole in which it is received and the other ear engaging the upper side of the sprocket hole in which it is received. In this manner, end or longitudinal play of a film section positioned on the swinging arm 34 is prevented.

The upper side or top wall of the swinging arm member 34 terminates at its forward end in a position substantially below the punch holding member 32 and the film end shaping member 33, and is formed and shaped to provide the film end shaping member or die 37. This die 37 is in the present example, referring now to Fig. 2, shaped in plan to conform to the shape of the tab 10 to be formed from the end of a film section to be shaped (see Fig. 26). The fixed position end shaping member or die 33 positioned above die 37, is cut out to a shape to conform to and receive the die member 37, so as to present edges 33a (see Figs. 3 and 11) to cooperate and engage with the edges 37a of die member 37, in order to cut the end portion of a film section engaged between such die members to the desired shape to form the tab 10 on the film section. The film end shaping die 37 is formed and provided with a perforating die opening 38 therein and therethrough (see Figs. 2 and 11), of a shape corresponding and conforming to the shape of the perforation or slot 12 (see Fig. 26) to be formed in the shaped end of a film section. The perforating die opening 38 is suitably located relative to the cutting edges 37a of die 37 to properly locate the perforation 12 in the end of a film section. A stripper plate 39 of channel shape in cross section is fastened and secured by its opposite walls to the opposite walls of the swinging arm member 34, with the upper side wall 39a of plate 39 bridging the upper surface 34a of the arm 34 in spaced relation thereabove (see Fig. 11 in particular). The upper or rear transverse edge 39b, referring now to Fig. 2, of the stripper plate 39a is beveled transversely of the plate in order to facilitate the insertion of a film section downwardly and forwardly between the stripper plate and the film positioning surface 34a of the swinging arm 34, while the lower or forward edge portion of the stripper plate 39a is formed to closely surround the perforating die opening 38 in the die member 37 on substantially three sides of such opening, namely, the upper or rear side and the opposite outer sides or ends of the opening. This will be clear by reference to Fig. 2 in connection with Fig. 11. The opposite sides of the channel shaped stripper plate 39 may be secured or attached to the adjacent opposite sides of the swinging arm 34 by spot welding, rivets or by other suitable fastening means. The lower forward portions of the opposite sides of the stripper plate are formed to provide toes 39c which engage and contact the upper edges of the body side walls 30a to limit the rearward and downward swing of the arm 34 (see Figs. 1 and 11).

The swinging arm 34 is provided with and carries a shearing wing or knife 40 which is, in the example hereof, formed as an integral extension of one side wall of the swinging arm 34. The shearing wing or knife 40 provides a lower cutting edge 40a which cooperates with a cutting or shearing edge 41 provided by the upper edge of the adjacent side wall 30a of the body 30, as will be clear by reference to Fig. 11. The opposite side walls 30a of body 30 are each provided at their upper rear ends with vertically disposed film guide portions 30c, and at the forward end of the shearing or cutting edge 41 a film guide 30d is provided by the edge forming side wall 30a, with a similar guide 30d being formed from the opposite side wall 30a in transverse alinement with the first mentioned guide 30d. The arrangement of the film guides 30c and 30d is particularly shown by Fig. 6.

A film cut off guide shelf or platform 42 is formed, in the instant example, integral with and extending outwardly and horizontally from the side wall 30a of body 30 that is opposite the side wall 30a which provides the film cutting edge 41. At the outer forward side portion of the platform 42, a film retaining plate 42a is bent up into position spaced above the upper surface of platform 42, and such plate 42a has a film locating and positioning tab 42b formed therefrom, as clearly shown in Figs. 1 and 7.

The punch holding member 32 at the upper end of the front wall 31 of the body 30 above the swinging arm 34 is provided with spaced punch holding ears 32a (see Figs. 3, 10 and 11) between which a suitable film perforating punch 43 is preferably detachably mounted in position depending therefrom and extending through closely fitting in a suitable opening formed through the member 32 therebelow. The punch 43 is provided with a cross sectional shape to conform to the shape of the perforating die opening 38 in die 37 carried on swinging arm 34, in order to form the perforation or slot of the desired shape in the film section. This punch 43 may be solid, as in the example hereof, or it may be formed hollow of a piece of suitable tubing, such as steel tubing deformed to the desired cross section shown in Fig. 3. The punch 43 is so positioned and located on the punch holding member 32 that it will enter the perforating die opening 38 when the die member 37 is swung upwardly and forwardly by the swinging arm 34. While only one punch 43 is disclosed, a plurality thereof may be mounted and properly positioned in the member 32, in accordance with the design requirements for the film section ends to be shaped, suitable changes being also made in the die 37 to provide the necessary conforming and mating perforating die openings, such as opening 38 for punch 43, in die 37, as well as suitable changes in cutting edges 33a and 37a. While the shearing or die member 33 is shown in this instance as formed from and integral with the punch holding member 32, such die member may be formed as a separate element suitably detachably secured to and supported from the adjacent portions of the opposite side walls 30a of body 30, and my invention contemplates and includes the use of a die member so formed and mounted.

In the operation and use of the above described example of film section end forming and shaping apparatus, the blade 40 is primarily provided for economical severing of an integral length of film when, in editing, it is desired to rearrange the sequence of scenes from that in which they were photographed on the film. The film could, of course, be torn apart or cut at random, but this would probably result in the loss of three (3) picture frames, or two (2) frames in length, as illustrated roughly in Fig. 26, where a central frame has been destroyed by cutting and the two adjacent frames are to be overlapped. If, however, the cut is accurately made with blade 40 while film is located with tab 42b, the cut will be made at the tip of tab 10, so that the film ends of both sections may have the tabs 10 formed in the end frames or the two frames that were adjacent prior to severance. By the foregoing operation only two (2) picture frames, or one (1) frame in film length, are lost.

As an example of the use of blade 40, the swinging arm 34 with the cutting or shearing blade 40, is swung upwardly or raised to position in which blade 40 is above the cutting or shearing edge 41, as shown in Fig. 10. The film is then inserted under the guide plate 42a on table 42, and placed across body 30 to a position with the film extending across cutting edge 41, the film being located relative to edge 41 by positioning one of its sprocket holes S on tab 42b. The arm 34 is then pressed or swung downwardly to swing blade 40 downwardly across and through the film, to shear or cut the film between the cutting edge 40a of blade 40, and the cooperating cutting edge 41 of the body side wall 30a.

With the swinging arm 34 in downwardly swung position as shown in Figs. 1 and 11, with the ears 39c of the arm abutting and engaging the adjacent portions of the upper edges of the body side walls, the arm is in position to receive and position a film for shaping. The end of a film section is then inserted under the stripper plate 39a of the stripper unit 39, and the film is pushed downwardly under the stripper plate until the tip of film contacts the transverse ears or bridge 34b of member 34. When the film section is withdrawn just enough to engage the first available sprocket hole S (referring to 8 mm. or 16 mm. type film) with an ear 36, the end portion of film section will be properly located relative to the die 37 for the cutting operation in proper spaced relationship to said sprocket holes and with a minimum wastage of film. The provision of locating bridge 34b facilitates performance of the film end locating operation quickly and by the sense of touch which is an advantage when working in a darkened room. Then, with the film section positioned on swinging arm 34, this arm is swung upwardly to a position in which the die 37 engages die 33 and the punch 43 enters the perforating die opening 38 to thereby shear or cut the end of the film section to form the end tab 10 (see Fig. 26) and to punch out and form the perforation 12 through the film end. The arm 34 is disclosed in its maximum upwardly swung position in Fig. 10, with punch 43 engaged in the perforating die opening 38 of die 37 and with die 37 in film cutting engagement and relation with die 33. It is to be here noted that the film end shaping member or die 33 is inclined slightly downwardly and rearwardly from a radial line through pivot 35, so as to provide a gradual shearing or cutting action as the die 37 is swung upwardly by rotation of arm 34 about the pivot pin 35 into shearing engagement with shaping die 33. Also, the end of punch 43 may be formed concave or convex transversely, to provide it also with a gradual shearing action to decrease punching effort. Or the upper surface of die 37 may be made concave to obtain the same result.

Upon completion of the forming and shaping of a film section end by the action of the dies 33 and 37 and of the punch 43 and its cooperating perforating die opening 38, the arm 34 is swung downwardly to its normal lowered position shown in Figs. 1 and 11. As the arm 34 is swung downwardly from its raised position as shown in Fig. 10, with the dies 33 and 37 and the punch 43 and the perforating die opening 38, in film shaping and forming engagement, the stripper plate 39a strips the shaped and formed film end from the punch 43 and the shaping die 33. After the arm 34, with the completely shaped and formed film section thereon, reaches its lowered position, the film section is lifted from engagement with the positioning ears 36 and the shaped film is then withdrawn from the apparatus ready for splice forming assembly with the film section to be joined thereto.

If desired or found expedient, the film sections to be formed and shaped preparatory to splicing, may both be positioned on the swinging arm 34 in superimposed position for simultaneous forming and shaping of the ends thereof by the operation of the apparatus as above described. But whether the film sections are separately or simultaneously formed or shaped, the use of the apparatus above described enables the shaping and forming operation to be performed rapidly and accurately, and insures complete uniformity in the shaped film ends formed thereby.

Figures 15, 16, 17, 18, 19, 20:
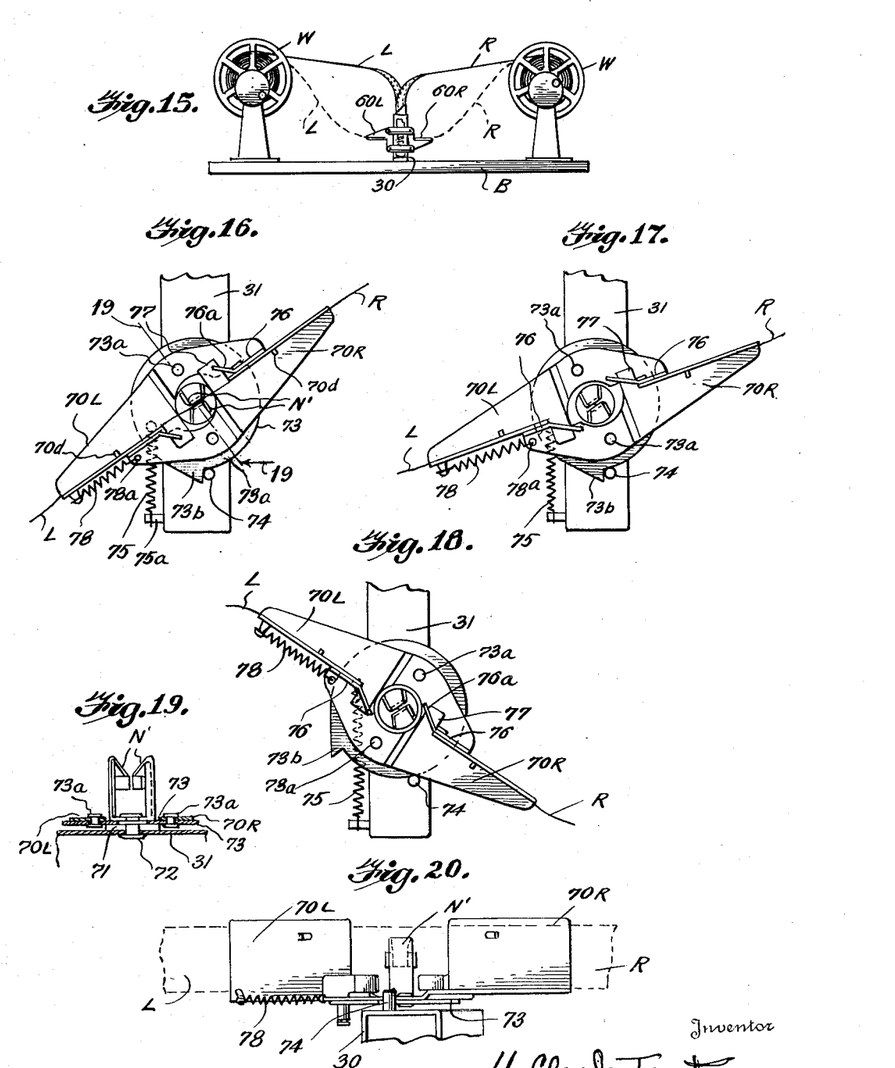
Fig. 15 is a view in front elevation, more or less diagrammatic, of the unitary film end shaping and splice assembling apparatus of Fig. 1, mounted on a suitable base in operative position between the film rewinding reels of a conventional film rewind apparatus.
Fig. 16 is a top plan view of a modified form of splice assembling apparatus, in which the film end carriers are not only swung or rotated around the splice assembling nose pieces but are also expanded or moved outwardly relative to each other to relatively move the film section ends in relation to each other and to the nose pieces; the film carriers being shown in normal position for receiving the film ends to be spliced.
Fig. 17 is a top plan view of a modified apparatus of Fig. 16, but showing the film carriers and film ends thereon in an intermediate position partially rotated around the nose pieces to cause initial interlocking of the prepared film section ends.
Fig. 18 is a top plan view of the apparatus of Fig. 16, but with the film carriers and the film ends thereon rotated to completed splice forming position.
Fig. 19 is a vertical transverse section through the film engaging nose pieces and film carriers, taken as on the line 19—19 of Fig. 16.
Fig. 20 is a front elevation of the modified form of splice assembling apparatus of Fig. 16, the film carriers being shown in the position thereof as shown in Fig. 17.

As will be clear from the foregoing in connection with the disclosures of Figs. 1 and 3 of the drawings, a unitary combination apparatus is provided which includes as coordinated component organizations, the film section end cutting and shaping mechanism and the assembling mechanism for forming the mechanically interlocked splices between such shaped ends, while also providing separate use of the assembling unit for disassembling film sections previously joined. The film assembling and splicing apparatus is mounted in position on the front or forward upwardly sloping wall 31 of the body 30 on which the film end forming and shaping mechanism is mounted, by means of the base 50, so that there is thus provided the unitary apparatus for carrying out all of the operations necessary to form and shape and to assemble the shaped ends of the film sections into spliced relation. This unitary apparatus is of particular utility in connection with a standard or conventional type of rewind apparatus, such as is more or less diagrammatically illustrated in Fig. 15 as being mounted upon a base B and as including spaced, opposite rewind reels W. This unitary apparatus of the invention may, as shown in Fig. 15, be mounted on the base B located between the rewind reel W. The apparatus will be found of particular utility in editing or reassembling film or scene sequences. For instance, the film can be severed as may be necessary to remove any desired section thereof, by the film cutting mechanism that includes the blade 40 carried by swinging arm 34, as particularly illustrated in Figs. 10 and 11. The apparatus is preferably mounted somewhat forward of the plane of reels W to facilitate the placing of film ends on the surface 34a. The ends of the cut or severed film sections selected for splicing are then placed in the forming and shaping apparatus by positioning them on the upper surface of swinging arm 34, with their ends extended under stripper plate 39 in position for shaping and perforating. After shaping and perforating, the film ends are then placed in the assembling apparatus in position on the movable film carriers 60R and 60L thereof, for operation of the carriers to mechanically interlock the shaped ends into spliced connection.

With respect to the splice assembling apparatus, I have developed several modifications thereof. One such modified design and arrangement of splice assembling apparatus is disclosed in Figs. 16 to 20, inclusive. It is characterized by the fact that the film carriers are not only rotatable around the end assembling noses but are also longitudinally movable relative to each other to displace the film carriers outwardly from and inwardly toward the film end assembling noses to thereby move the overlapped film ends away from and toward each other; and by the further fact that such modified form of apparatus functions to not only perform the final interlocking of the splice into completed assembly, but also to perform the initial or primary interlocking or interengaging of the film section ends, as by the lips 14 of Fig. 26 of the form of splice of Fig. 27.

This modified form of apparatus may be aptly termed a rotating or swinging and expanding type, and referring now particularly to Fig. 19, the apparatus embodies a bearing plate or spacer 71, with the nose pieces N' secured thereon and to the base 31 by a rivet or suitable shoulder stud 72. A plate 73 is journaled between the spacer 71 and the lower surface of the nose members N', for rotation around stud 72 as an axis while supported on the shoulder of such stud.

Film carriers 70L and 70R, of the general design of those described in connection with the preferred form of the assembling apparatus of Fig. 3, are pivotally mounted in position on the plate 73, by means of the pivot pins 73a located at points diametrically opposite the nose pieces N'. The film carrier mounting plate 73 is rotatably mounted on stud 72 and a stop pin 74 mounted on the base 31 is arranged to engage a lug 73b at the outer edge of plate 73, so as to hold such plate against rotation in a counterclockwise direction while permitting rotation of the plate in a clockwise direction. A spring 75 is attached at one end to a post 75a on the base 30a sidewall and at its opposite end to the plate 73, and such spring normally holds and maintains the plate 73 rotated to position with lug 73b engaging post 74 so as to maintain the film carriers in their normal position shown in Fig. 16.

The film carriers 70L and 70R are mounted and arranged so as to have longitudinal movement relative to each other between collapsed position moved inwardly toward each other and expanded positions moved outwardly in opposite directions from the nose pieces N', and these carriers are held in longitudinal alinement and operative association by the slides 76 which are provided with spaced ears 76a fitting and extending over guide tabs 77 of the opposite film carrier. The film carriers 70L and 70R are constantly urged toward each other and yieldingly maintained in their collapsed or maximum inwardly moved positions on the plate 73 by a spring 78 which is connected between a lug or post at the outer end of carrier 70L, and an eye portion 78a formed in the adjacent inner end portion of the opposite carrier 70R.

The normal position of the film carriers preparatory to operation of the apparatus to inter-engage and assemble the shaped film ends is shown in Fig. 16, and film sections R and L shaped for the form of splice of Fig. 26, are indicated as positioned on the film carriers 70R and 70L, respectively, with the shaped ends of these film sections inserted between the nose pieces N' in overlapped position and relation. The end of film section R is overlapped onto the end of film section L, and the film sections are positioned on the carriers by the tabs 70d so that there will be excess lapping of the film ends with the carriers in their normal collapsed position of Fig. 16. With the film sections so positioned and the shaped ends thereof over-lapped and disposed between the nose pieces N', the right hand film carrier 70R is then depressed or rotated to displace the same downwardly which results in rotation of the carriers 70R and 70L about their respective pivots 73a, with the left hand film carrier moving in an upward direction and both film carriers also simultaneously moving longitudinally relatively to each other in outward directions to the expanded position thereof as shown in Fig. 17. During this initial movement of the film carriers around the nose pieces N', and simultaneously outwardly longitudinally of each other to expanded position, the plate 73 is maintained in its normal position held against stop 74 by the spring 75. During this expanding and rotary movement of the film carriers, the shaped ends of the film sections are drawn apart while the rotation of the overlapped film ends relative to the stationary nose pieces N' causes the nose pieces to deflect the lips 14 so that these lips hook over and engage each other in the manner hereinbefore explained. (See Fig. 29.)

After the initial movement of the film carriers 70R and 70L to the position of Fig. 17, with the resulting hooking of the lips 14 of the film section ends together, the film carriers with the plate 73 on which they are mounted, are rotated further in a clockwise direction against the forces of the spring 75, to the position as shown in Fig. 18, which movement displaces or wraps the initially interlocked film section ends around the nose pieces N', respectively, so as to cause the nose pieces to force the film section end tabs 10 through the film perforations 12 to complete the final interlocking and formation of the splice. (See Figs. 27 and 28.) It is to be noted that the design and arrangement of this form of the apparatus is such that, as the film carriers are rotated around the nose pieces N' from the position of Fig. 17, to the position of Fig. 18, the effective length of the film ends is decreased and straining of the film is thereby avoided due to the partial inward movement or collapse of the film carriers 70L and 70R toward each other and toward the nose pieces N'. The degree or extent of the clockwise rotation of the carriers in this final movement thereof is determined by the engagement of the right hand carrier 70R against the stop pin 74. (See Fig. 18.) Upon completion of the splice assembly, the film carriers are released and are then returned to their normal position by the action by spring 75, after which the spliced film sections may be removed from the apparatus.

Figure 21:
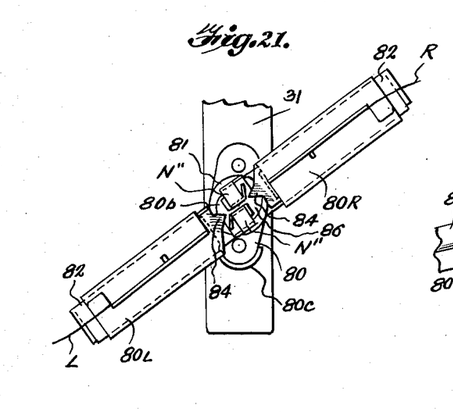
Fig. 21 is a top plan of another form of film splicing apparatus in which the film carriers in addition to being mounted for rotation about the nose pieces, are also mounted and arranged for sliding movement relative to each other to move the film ends relative to the nose pieces as such ends are rotated with the carriers, the film carriers in Fig. 21 being shown in their normal position for receiving the film ends to be spliced.
Figure 22:
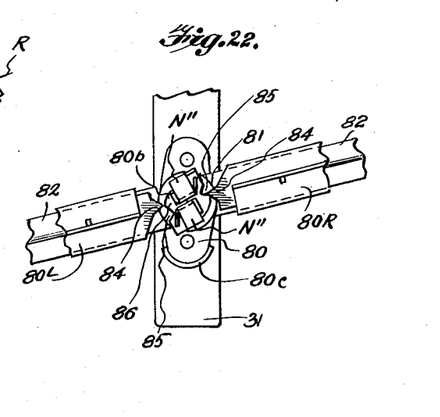
Fig. 22 is a top plan view of the modified apparatus of Fig. 21, with the film carriers being shown in position partially rotated relative to the nose pieces for initially interlocking the film section ends.
Figures 23, 24:
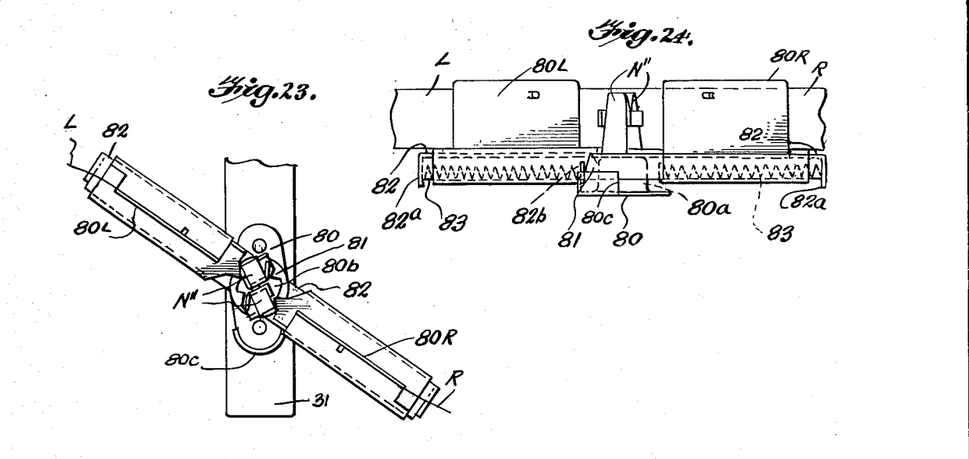
Fig. 23 is a top plan view of the apparatus of Fig. 21, but with the film carriers being shown in their position of maximum rotation relative to the nose pieces for completing the interlocking of film section ends into the completed splice.
Fig. 24 is a front elevation of the apparatus of Fig. 21, with the film carriers being shown in the position of Fig. 21.
Figure 25:
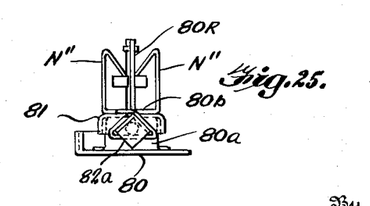
Fig. 25 is a view in end elevation of the apparatus of Fig. 21.

Another modified form of film assembly apparatus is disclosed in Figs. 21 to 25, inclusive, and such modified form is characterized by an arrangement and mounting of the film carriers by which the carriers are rotatable around the film end assembly nose pieces and are also mounted for sliding movement in opposite directions away from and toward each other, to expanded and collapsed positions relative to the nose pieces. Referring now particularly to Figs. 24 and 25, this modified form of the apparatus includes a sub-base 80 for mounting upon a main base, such as the base 31, which sub-base includes an elevated or raised central portion 80a having the nose pieces N'' mounted in fixed position thereon extending upwardly therefrom and in axial alignment therewith.

A film carrier mounting and supporting body comprising the central hub forming portion 81, with the opposite arms 82 extending radially therefrom in longitudinal alinement, is mounted upon the raised portion 80a of sub-base 80 for rotation thereon about the vertical axis of the portion 80a. The hub portion 81 is mounted between the upper surface of the elevated base portion 80a and the base forming lower surface of the nose pieces N'', for rotation around a suitable pivot pin or stud (not shown) by which the nose pieces N'' are secured and mounted on the elevated base 80a, the nose pieces being mounted upon or formed extending upwardly from a suitable base plate 80b. Thus, the film carrier mounting arms 82 extend radially outwardly from the central hub portion 81, and are rotatable around the nose pieces N'' on the elevated base portion 80a.

Film carriers 80R and 80L, generally similar to the film carriers of the apparatus hereinbefore described, are slidably mounted on the opposite arms 82, respectively, for movement in opposite directions longitudinally of said arms, inwardly and outwardly toward and from each other and the nose pieces N''. The film carriers 80R and 80L are constantly urged inwardly toward each other and maintained in their collapsed or inwardly moved positions by compression spring 83. Each arm 82 has a spring 83 bearing at one end against a flange 82a bent downwardly from the arm at the outer end thereof, and extending inwardly along the arm to the inner end of the film carrier which is mounted on that arm where the opposite end of the spring bears against a lip 82b formed from the carrier at the inner end thereof. (See Fig. 24.)

The inner end of each film carrier is formed with a longitudinally disposed and inwardly extending tooth 84, which is adapted to engage in a notch 85 formed in the adjacent edge portion of a cam plate 86 formed by the base plate 80b of the nose pieces N''.

In the operation of the modified form of the apparatus of Figs. 21 to 25, the normal starting position of the arms 82 and the film carriers 80R and 80L, is shown in Fig. 21, in which position the teeth 84 at the inner ends of the film carriers are engaged in and received by the notches 85, respectively, in the cam plate 86, so that, under the action of the springs 83, the film carriers are pushed or slid on arms 82 to their collapsed position moved inwardly toward each other on the arms 82. In this position, the film sections, such as sections R and L, are mounted and positioned on the film carriers 80R and 80L, respectively, in a manner generally similar to that described in connection with the apparatus of Fig. 16, with the ends of the sections overlapped and positioned between the nose pieces N''. With the film section ends shaped in accordance with Fig. 26 to form the splice of Fig. 27, the initial hooking or inter-engaging of the lips 14 of the shaped ends of the sections, is carried out by rotating the arms 82 with the film carriers 80R and 80L thereon, in a clockwise direction to the position shown in Fig. 22. During this movement, the carriers 80R and 80L are expanded outwardly on the arms 82, away from each other by the camming action of the sides of the notches 85 upon the teeth 84, respectively, at the inner ends of the carriers, and this expanding action combined with the rotation of the carriers around the nose pieces N'' draws the ends of the film sections mounted on the carriers, away from each other while the noses N'' deflect the lips 14 to cause the same to hook over or engage each other.

With the film carriers initially rotated to the position of Fig. 22, the arms 82 with the film carriers are then further rotated in a clockwise direction to the position of Fig. 23, which displaces or wraps the film section ends around the nose pieces N'', so as to cause such noses to force the end tabs 10 of the film sections through the perforations 12 into position interlocking the film sections and completing the assembly of the splice. The carriers are permitted to move toward each other during the swing from position of Fig. 22 to position of Fig. 23 by the spiral shape of cam plate 86 (or 80b) upon which the teeth 84 ride and are guided. The arms 82 with the film carriers may then be rotated in a counter clockwise direction back to the normal position of Fig. 21, whereupon the spliced film sections R and L may be removed from the apparatus.

The sub-base 80 in the assembly hereof is formed with an upwardly bent flange 80c, in this instance at the lower end of the sub-base, which flange is so positioned relative to the arms 82 that the left hand edge thereof forms a stop for engaging the left hand carrier 80L with the carriers in normal position, while the opposite edge of lip 80c is engaged by the right hand carrier 80R to limit the clockwise rotation of the film carriers and determine the final assembling position of the film carriers as shown in Fig. 23.

With respect to both the modification of the film assembling apparatus of Fig. 16, and of the above described modification of Fig. 21, it is to be noted particularly that the slot or space between the film end assembling noses is substantially in line with the film carriers when the latter are in their initial, normal position for receiving the overlapped film ends, so that there is no initial deflection of the film ends until the rotation of the film carriers about the nose pieces has started. This distinguishes these forms of the apparatus from the arrangement of the preferred form of Fig. 3, in which the insertion of the film section ends between the nose pieces is accompanied by immediate deflection of the portions of the film section ends engaged by the noses N in opposite directions, so that manual outward movement of the film sections away from each other will result in hooking or engaging the lips 14. On the other hand, in the modified forms of the apparatus the initial hooking or engaging of the film section ends as by the lips 14, is performed with the apparatus by the initial rotation or movement of the film carriers about the nose pieces. And it is to be further noted that these modified forms are also useful for disconnecting previously formed splices.

It is also evident that various other designs, arrangements, modifications, combinations and constructions might be resorted to without departing from the broad spirit and scope of my invention, and hence, I do not desire or intend to limit and restrict my invention in all respects to the specific disclosures of the several embodiments thereof illustrated and described herein by way of example.

What I claim is:

1. In apparatus for splicing film sections, in combination, assembling noses providing a slot therebetween for receiving the overlapped ends of film sections to be spliced, film section carriers mounted at opposite sides of said noses for receiving and positioning the film sections thereon, respectively, with the ends of the film sections overlapped and positioned in the slot between said noses, and said film section carriers and said noses being mounted and arranged for relative movements to draw the film sections positioned on said carriers against said noses, respectively.

2. In apparatus for splicing film sections, in combination, film section engaging members providing a space therebetween for receiving the overlapped ends of film sections to be spliced, film section carriers for receiving and positioning the opposite film sections thereon, respectively, with the ends of the film sections overlapped and positioned in the space between said members, and said carriers and said engaging members being mounted and arranged for relative movements to draw the overlapped ends of the film sections laterally to engage opposite sides thereof against said members, respectively.

3. In apparatus for splicing film sections, in combination, film section carriers for receiving and positioning the opposite film sections thereon, respectively, with the ends of the film sections being overlapped, engaging members positioned for engaging opposite sides of the overlapped ends at locations spaced longitudinally thereof, and said carriers and said engaging members being mounted and arranged for relative movement to force opposite sides of the overlapped film section ends laterally against the adjacent engaging members, respectively.

4. In apparatus for splicing film sections, in combination, film section engaging members providing a space therebetween for receiving the overlapped ends of film sections to be spliced, said members being positioned to engage the overlapped film section ends at opposite sides and at locations spaced longitudinally thereof, respectively, film section carriers for receiving and positioning film sections thereon, respectively, with the ends of the film sections being overlapped and positioned in the space between said film engaging members, and said carriers and said engaging members being mounted and arranged for relative movements to move the overlapped ends of the film sections laterally into engagement at opposite sides thereof with said engaging members, respectively.

5. In apparatus for splicing film sections, in combination, nose members spaced apart to provide a slot therebetween for receiving the overlapped ends of film sections to be spliced, film section carriers located at opposite sides of said nose members for receiving and positioning the film sections thereon, respectively, with the ends of the film sections overlapped and positioned in the slot between said noses, and said film section carriers and nose members being mounted and arranged for relative movement therebetween to engage the overlapped ends of the film sections against said nose members.

6. In apparatus for splicing film sections, in combination, splice assembling nose members having a slot therebetween for receiving the overlapped ends of film sections to be spliced, film section carriers located adjacent said nose members for receiving and positioning the film sections thereon, respectively, with the ends of the film sections overlapped and positioned in the slot between said noses, said carriers being mounted for movement relative to each other to move the overlapped ends of the film sections to increase or decrease the extent of overlap thereof, and the said carriers and nose members being mounted and arranged for relative movement therebetween to engage the overlapped ends of the film sections against said nose members.

7. In apparatus for splicing film sections, in combination, film engaging members providing a space therebetween for receiving the overlapped ends of film sections to be spliced, said members being positioned to engage the overlapped ends at opposite sides and at locations spaced longitudinally thereof, film section carriers for receiving and positioning the opposite film sections thereon, respectively, with the ends of the sections being overlapped and positioned in the space between said members, said carriers being mounted for movements relative to each other to move the overlapped ends of the film sections longitudinally relative to each other to increase or decrease the extent of overlap thereof, and the said carriers and film engaging members being mounted and arranged for relative movements to laterally engage opposite sides of the overlapped ends of the film sections against said engaging members, respectively.

8. In apparatus for splicing film sections, in combination, film section carriers for receiving and positioning thereon the opposite film sections, respectively, to be spliced, with the ends of the sections being overlapped, film engaging members positioned for engaging opposite sides of the overlapped film section ends at locations spaced longitudinally thereof to apply laterally acting forces to the film section ends respectively adjacent thereto, and said carriers being mounted and arranged for movements relative to each other to move the overlapped ends of the film sections longitudinally relative to each other and for movements in opposite directions about said engaging members to force said members into engagement with the adjacent film section ends at opposite sides of the overlap thereof.

9. In apparatus for splicing film sections, in combination, film engaging members providing a space therebetween for receiving the overlapped ends of film sections to be spliced, film section carriers for receiving and positioning thereon the opposite film sections, respectively, to be spliced with the ends of the film sections being overlapped and positioned in the space between said engaging members, said carriers being mounted for movement relative to each other to move the overlapped ends of the film sections longitudinally relative to each other, and said carriers and said engaging members being mounted and arranged for relative movements to engage said members with and force the same laterally against the opposite sides of the overlapped film section ends.

10. In apparatus for splicing film sections, in combination, members providing a slot therebetween for receiving the overlapped ends of film sections to be spliced, each of said members formed to provide an assembling nose with said noses spaced apart along the slot, film section carriers movably mounted at opposite sides of said members adjacent the opposite ends, respectively, of said slot, each of said carriers adapted to receive and position a film section with its end disposed in the slot between said members in overlapped relation with the end of the other film section, and the said film section carriers being movable in opposite directions to draw the overlapped ends of the film sections positioned thereon laterally against said noses, respectively.

11. In apparatus for splicing film sections, in combination, a base, members on said base extending outwardly therefrom in spaced relation to form a slot therebetween for receiving the overlapped ends of the film sections to be spliced, each of said members being provided with an assembling nose at opposite ends of said slot spaced a distance longitudinally of the slot from the assembling nose of the other member, film section carriers supported from said base and positioned opposite the ends, respectively, of the slot between said members, said film carriers adapted to receive and position a film section thereon with the end of the section disposed in the slot between said noses in overlapped relation with the end of the film section positioned on the other of said carriers, and the said film carriers being movably supported from said base for movement in opposite directions to draw the film sections positioned thereon in opposite directions laterally against said assembling noses, respectively.

12. In apparatus for splicing film sections, in combination, assembling noses mounted spaced apart facing each other and being offset and spaced apart laterally to form a space therebetween for receiving the overlapped ends of film sections to be spliced, with film section carriers movably mounted at opposite sides of said noses for displacement in opposite directions transversely of the space between said noses.

13. In apparatus for splicing film sections, in combination, assembling noses mounted in position spaced apart laterally and extended inwardly toward each other in spaced relation to define a space therebetween to receive the ends of film sections with the film sections overlapped and hooked together against longitudinal movement outwardly away from each other when the film sections are placed under tension, film section carriers movably mounted at opposite sides of said noses adjacent the opposite ends, respectively, of the film receiving space between the noses, said film carriers being adapted to receive and position the film sections thereon, respectively, with the film section ends overlapped and positioned in the space between said noses, and the said film carriers being displaceable in opposite directions to draw the overlapped ends of the film sections against the said noses, respectively.

14. In apparatus for splicing film sections, in combination, assembling noses mounted in position spaced apart laterally and extended inwardly toward each other to define a space to receive the ends of film sections in overlapped relation therebetween, each of said noses extended across the space between the noses a distance relative to the other nose to be disposed in overlapped relation therewith, film section carriers movably mounted at opposite sides of said noses adjacent the opposite ends, respectively, of the film section receiving opening between the noses, said carriers in normal position disposed in alinement and being displaceable from normal position in opposite directions to film section end assembling position with each carrier being moved in a direction opposite the direction in which the nose extends that is respectively adjacent thereto.

15. In apparatus for splicing film sections, in combination, assembling noses mounted in position spaced apart laterally and facing inwardly toward each other in spaced relation to form a space between said noses for receiving the overlapped ends of film sections, film section carriers movably mounted at opposite sides of said noses adjacent the opposite end, respectively, of the film end receiving space therebetween, said carriers being mounted for movement in opposite directions outwardly from said noses to move the overlapped ends of film sections positioned thereon longitudinally outwardly relative to each other, and the said carriers being also mounted for simultaneous swinging about said noses as an axis to draw the overlapped film section ends in opposite directions against said noses, respectively.

16. In apparatus for splicing film sections, in combination, assembling noses mounted in position spaced apart laterally and facing inwardly toward each other in spaced relation to form a space between the noses for receiving the overlapped ends of film sections, a plate member mounted for rotation about the base portion of the noses as an axis, film section carriers mounted on said plate member extending radially therefrom at opposite sides of the noses adjacent the opposite ends, respectively, of the film receiving space between the noses, each film carrier being mounted on said plate for swinging independently thereof about an axis parallel to the axis of rotation of the plate, the said carriers being operatively coupled together to cause swinging of one thereof about its pivot on the plate to swing the other about its pivot in the same direction with the carriers moved longitudinally relative to each other in opposite directions inwardly toward or outwardly from said noses, force exerting means maintaining said plate against rotation under the action of swinging forces applied to said carriers, and the said plate and carriers rotatable as a unit about said noses by the application of rotating forces thereto of a magnitude to overcome the said force exerting means.

17. In apparatus for splicing film sections, in combination, assembling noses mounted in position spaced apart laterally and facing inwardly toward each other in spaced relation to form a space between the noses for receiving the overlapped ends of film sections, a hub member rotatably mounted adjacent the base portion of said noses for rotation therearound as an axis, opposite arms mounted on and extending in longitudinal alinement radially from said hub member, a film section carrier slidably mounted on each arm for movement longitudinally thereof toward and from said hub member, force means constantly exerting forces on said carriers to move the same inwardly toward each other on said arms, said carriers in normal position of said arms relative to the noses being maintained by said force means in maximum positions of inward movement on said arms, said arms and carriers being rotatable as a unit about the said noses, and means for forcing said carriers outwardly on said arms against the action of said force means by the rotation of the arms and carriers from normal position relative to said noses.

18. In apparatus for splicing film sections, a base, splice assembling noses mounted on said base in position spaced apart laterally and facing inwardly toward each other in spaced relation to form a space between the noses for receiving the overlapped ends of film sections with the opposite sides of the overlapped films adjacent said noses, respectively, film section carriers positioned at opposite sides of said noses adjacent the opposite ends, respectively, of the film end receiving space between said noses, a link mechanism pivotally mounted on said base at opposite sides of said noses, and said film carriers being pivotally mounted on said link mechanism and being movable therewith and guided thereby in opposite directions across the ends of the film receiving space between said noses.

19. In apparatus for forming and shaping the ends of film sections for splicing, in combination, a base, an arm member pivotally mounted at one end to said base for vertical swinging, the upper side of said arm providing a surface for receiving and positioning a film section thereon, a film section end shaping die at the upper side of said arm, a stripper plate adjacent said die for engaging the film section to disengage the film from a punch, a film section shaping member mounted in position above said arm for film cutting engagement by said arm carried die when said arm is swung upwardly.

20. In apparatus for forming and shaping the ends of film sections for splicing, in combination, a base, an arm member pivotally mounted on said base for vertical swinging, a film end shaping die mounted on said arm, a film end shaping die mounted supported from said base in position above said arm for film cutting engagement with said arm carried die when the arm is swung upwardly, a film perforating punch supported from said base, a perforating opening formed in said arm for receiving said punch when the arm is swung upwardly to position engaging said shaping dies, the upper side of said arm providing a surface for receiving and positioning a film section thereon with the end of the section disposed over said arm carried die and said perforating opening for shaping and perforating when the arm is swung upwardly to position engaging the film between said dies and the punch and perforating opening.

21. In apparatus for forming and shaping the ends of film sections for splicing, in combination, a base, an arm member pivotally mounted at one end on said base for vertical swinging, a film section end shaping die at the upper side of said arm, a film section shaping member located in normally fixed position above said arm for film cutting engagement by the die carried by said arm when the arm is swung upwardly, the upper side of said arm providing a surface for receiving and positioning a film section thereon for end shaping between said arm carried die member and said shaping member located thereabove, a cutting blade carried by said swinging arm, and a fixed position cutting blade located on said base for film cutting engagement with said arm carried blade, and film guide means located on said base for positioning a film across said base carried blade for cutting by downward swinging of said arm carried blade.

22. In apparatus for forming and shaping the ends of film sections for splicing, in combination, cooperating relatively movable punch and die end shaping members, means for locating a film section relative to said members, and a stripping member arranged to disengage the film section from the punch after the forming and shaping operation.

23. Unitary apparatus for shaping the ends of film sections to be spliced and for splicing such shaped ends together, embodying in combination, a body structure having an upwardly and rearwardly inclined forward wall, a swinging arm pivotally mounted at its forward end on said body structure below the upper end portion of said forward wall for vertical swinging, a film end shaping die located at the upper side of said arm, film end shaping members located at the under side of the upper portion of said forward wall for engagement by said arm carried die when the arm is swung upwardly, and film splicing mechanism mounted on said forward wall for receiving and splicing the ends of film sections after shaping of such ends between said arm carried die and the shaping member at the under side of the upper portion of said forward wall, said film splicing mechanism being mechanically disconnected from said shaping mechanism to permit separate operation thereof to disassemble film sections previously spliced.

24. Apparatus for shaping the ends of film sections to be spliced and for splicing such shaped ends together, embodying, in combination, a body structure providing an upwardly and rearwardly inclined forward wall, a swinging arm pivotally mounted at its forward end on said body structure below the upper end portion of said forward wall for vertical swinging, film end shaping members located at the underside of the upper portion of said forward wall for engagement by said arm carried die when the arm is swung upwardly, film splicing mechanism mounted on said forward wall below the upper end thereof for receiving and splicing the ends of film sections after shaping of such ends between said swinging arm carried die and said shaping member at the under side of the upper portion of said forward wall, and said splicing mechanism including a base structure mounted on said forward wall, film section engaging members mounted on said base member, and film section carriers pivotally mounted on said base member in position extending outwardly at opposite sides thereof beyond said body structure below and unobstructing said die carrying arm and said film end shaping members.

HARRY CLARK FOSTER.

REFERENCES CITED

The following references are of record in the file of this patent:

UNITED STATES PATENTS

| Number | Name | Date |
| --- | --- | --- |
| 983,873 | Clark | Feb. 14, 1911 |
| 1,927,063 | Conn | Sept. 19, 1933 |
| 1,994,913 | Howell | Mar. 19, 1935 |
| 2,002,554 | Townley | May 28, 1935 |
| 2,064,414 | Cohn et al. | Dec. 15, 1936 |
| 2,101,458 | Sachtleben | Dec. 7, 1937 |
| 2,318,287 | Brolin | May 4, 1943 |
| 2,433,446 | Foster | Dec. 30, 1947 |
| 2,475,351 | Castay | July 5, 1949 |